United States Patent [19]

Tsai et al.

[11] Patent Number: 5,077,484
[45] Date of Patent: Dec. 31, 1991

[54] LIGHT CONTROLLED EXTENSION SOCKET

[76] Inventors: Shiang Shiun Tsai; Ming Jeng Tsai, both of 9-1, Lane 161, Hsing An Road Sec. 1, Taichung, Taiwan

[21] Appl. No.: 624,985
[22] Filed: Dec. 10, 1990
[51] Int. Cl.$^5$ .................. H01R 13/70; H01R 25/00
[52] U.S. Cl. .................................. 307/39; 307/117; 361/173
[58] Field of Search ................ 250/206; 307/38, 39, 307/40, 117; 361/173

[56] References Cited

U.S. PATENT DOCUMENTS 4,902,906  2/1990  Murphy ........................ 307/117 X
4,945,017  2/1991  Sellati et al. ........................ 307/38

Primary Examiner—A. D. Pellinen
Assistant Examiner—Deu V. Le

[57] ABSTRACT

A light level controlled electrical extension socket comprising a main body on which is formed two pairs of insertion sockets for receiving an appliance's power plug, a photosensitive element externally mounted in a housing on the main body, an extension cord attached to a power outlet, and a pair of indicator lights for each respective pair of insertion sockets. Each insertion socket comprises three receiving slots, whereby, a power plug inserted to the right side always receives power as in a convention adapter. A power plug inserted to the left side has its power turned on or off automatically according to prevailing light levels. A first pair of insertion sockets has its power on in automatic mode, i.e. the left side when the second pair has its power turned off, and vice versa. The indicator lights for each corresponding pair of insertion sockets reflect the status of each respective pair.

2 Claims, 4 Drawing Sheets

LIGHT CONTROLLED EXTENSION SOCKET

BACKGROUND OF THE INVENTION

The present invention relates to an extension adapter and particularly to an extension adapter which can automatically switch attached electrical appliances on or off in accordance with the alternations of light level in the operating environment of the extension adapter.

The present invention is a valuable tool in the automation of the home or office. The power sources of lighting fixtures, various electric appliances such as electric cookers, stereo sets, coffee makers, water boilers, etc. and even a thermostat can be automatically switched on or off on the basis of pre-determined light levels in the vicinity of the adapter or even in a remote location through an external sensor.

It is a primary objective of the present invention to provide an extension adapter which can automatically switch power to attached appliances on or off according to prevailing light levels in the environment of the adapter.

A secondary objective of the present invention is to provide an extension adapter that has three insertion receptacles for each plug, such that a user can selectively choose conventional operation or automatic light level control for each appliance.

Yet another objective of the present invention is to provide a light level sensitive extension adapter designed in such a way that the light level in a remote location can be used to control the adapter by means of a remote phot-sensitive element attached through an extension wire to the body of the adapter.

SUMMARY OF THE PRESENT INVENTION

The light controlled extension adapter of the present invention comprises a main body on which is formed four insertion sockets divided into two sets of two each.

Each insertion socket consists of a row of three receiving slots. The two prongs of the power plug of an appliance can be inserted into either the left and central slot or the central and right slot to select between normal operation and automatic light level controlled switching.

Positioned between the two sets of insertion sockets is a photo-sensitive element that, through an internal circuit, controls the power to appliances plugged into the left side of a respective socket, in accordance with prevailing light levels. All appliances plugged into the right side of a socket act normally with uninterrupted power as in a conventional adapter.

The two sets of insertion sockets are differentiated in that, once the light level in the environment rises or falls through a pre-determined threshold as sensed by the photo-sensitive element, the control circuit turns power on to one set of insertion sockets and off to the other set. An indicator lamp among each set of insertion sockets lights up whenever the respective set of sockets is supplying power.

The invention is hereinafter described with reference to the accompanying drawings in which.

Figure 1:
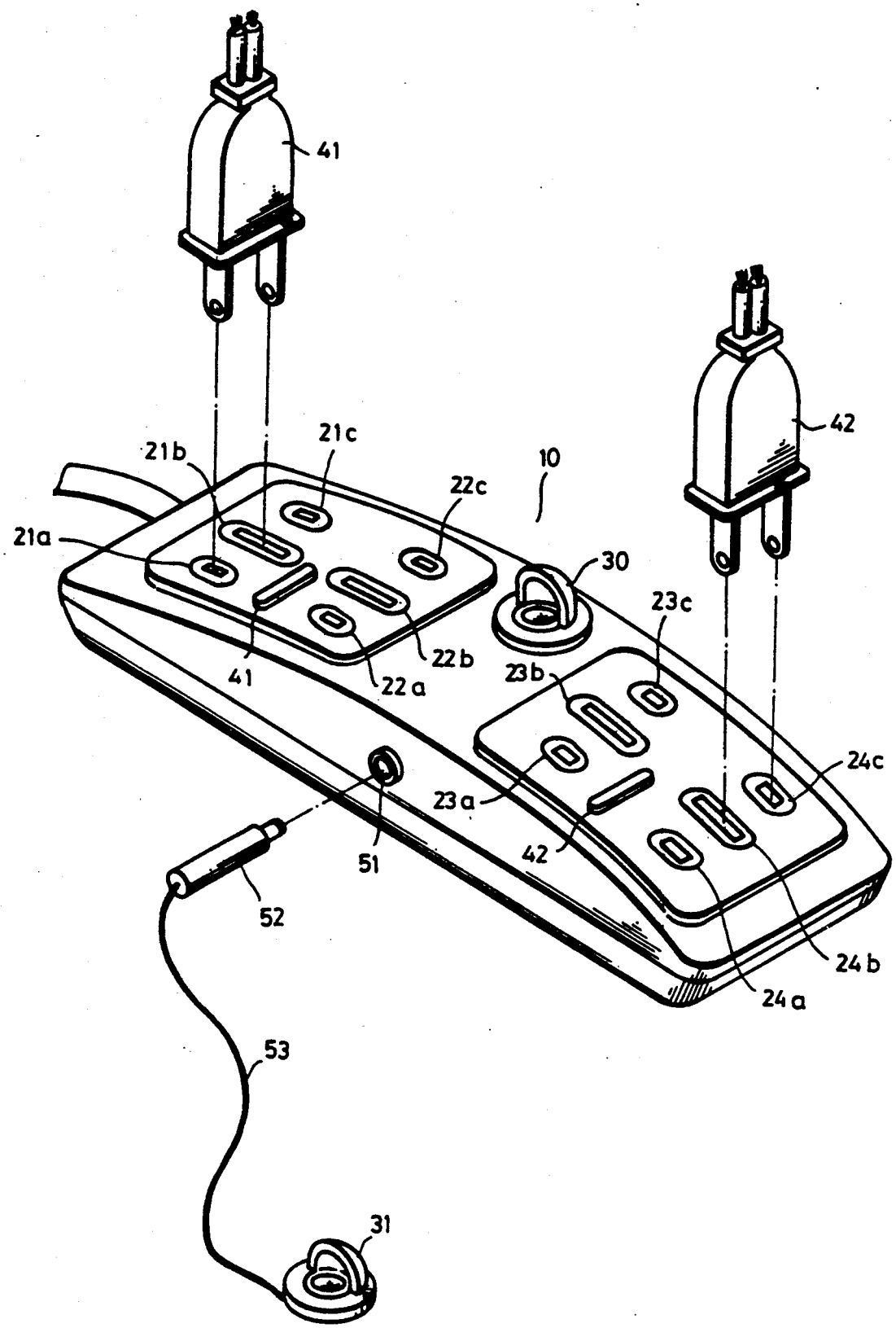
FIG. 1 is a perspective view of the exterior of the extension adapter of the present invention.

Referring to FIG. 1, the external arrangement of an embodiment of the light controlled extension adapter of the present invention comprises a main body 10, attached to a power outlet through extension cord, housing 30 for a photo-sensitive element, and two pairs of insertion sockets disposed respectively to either side of housing 30. A first pair of insertion sockets comprises recieving slots 21a, 21b, 21c, and 22a, 22b, 22c. Each row of three recieving slots forms an insertion slot for power plugs 41 or 42. A second pair of insertion sockets comprises receiving slots 23a, 23b, 23c, and 24a, 24b, 24c. When a power plug 41 or 42 is inserted to the right hand side of any insertion socket, the power socket will receive power normally as in a conventional extension adapter. When inserted to the left hand side of any insertion socket, however, the power to a plug is automatically controlled by prevailing light levels.

A first pair of insertion sockets operates in opposite manner from the second pair of insertion sockets. When a power plug is inserted into the left side of any insertion socket, and hence under automatic light control. When power is available to the first pair of insertion sockets on the left pair of recieving slots due to prevailing light conditions, power is cut off to the second pair of insertion sockets in the corresponding pair of recieving slots and vice versa in the reverse situation. The status of each pair of insertion sockets is shown by an indicator lamp. Indicator lamps 41 and 42 light when power is available in automatic light controlled mode in respective pairs of insertion sockets.

An auxiliary photo-sensitive element 31 is attached to plug 52 via wire 53. When plug 52 is inserted into jack 51 disposed on the side of main body 10, the auxiliary photo-sensitive element 31 can be placed in a remote environment allowing light levels there to control the extension adapter.

Figure 2:
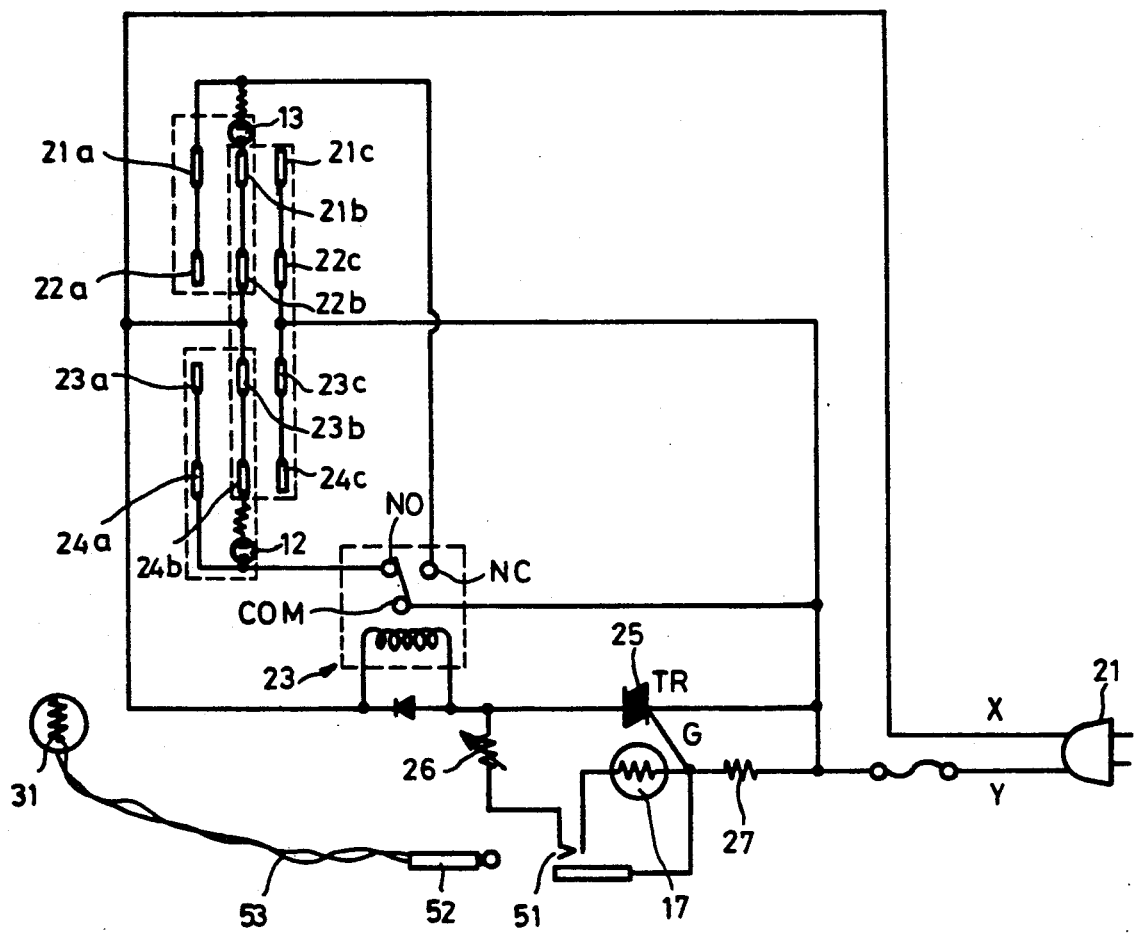
FIG. 2 is a circuit diagram of a first embodiment of a control circuit for the extension adapter of the present invention.

Referring to FIG. 2, one embodiment of a control circuit housed within the main body 10 is shown in diagrammatic form.

First, note that contacts 11c, 12c, 13c, and 14c which correspond with the right side receiving slots 21c, 22c, 23c, and 24c, all have direct electrical paths with the Y terminal of the AC plug 21. Likewise, contacts 11b, 12b, 13b, and 14b which correspond with the central receiving slots 21b, 22b, 23b, and 24b, all have direct electrical paths with the X terminal of the AC plug 21. Thus, as described above any plug inserted into the right side of any of the four insertion sockets will continuously have power available to it as in a conventional adapter.

The same relationship for the central and right columns of contacts holds for all embodiments of the control circuit described below.

A photosensitive element, such as CdS photoresistor 17, when activated by a sufficient light level will have a resistance value of between several hundred to 2000 ohms. This triggers a thyristor such as triac 25 by allowing sufficient voltage applied to its gate G. Variable resistor 26 can be used to adjust the activation point for the required light level.

Once triac 25 conducts current, the electromagnet of AC relay 23 is activated, throwing its contact arm from the NC contact to the NO contact, as depicted in the illustration.

This forms an electrical path between the Y terminal of the AC plug and contacts 13a and 14b, which correspond with the left side recieving slots 23a and 23b of the second set of insertion slots.

Hence, any AC plug inserted into the left side, automatic control mode, of the second set of insertion sockets will have power available to it. A neon bulb 12, corresponding to indicator lamp 42, lights up to indicate power available to the second set of insertion sockets. Alternately, neon bulb 13 is in the off state with no power available in the left side of the first set of insertion sockets.

This status reverses only when the light level is reduced to an amount whereby the resistance of the photoresister 17 increases to a value of several hundred thousand to several million ohms to turn off triac 25. The contact arm of relay 23 then returns to the NC position to supply power to the first set of insertion sockets and turn off power to the second set. The corresponding indicater lamps likewise reflect the change.

Auxiliary photosensitive element 31 which is also a CdS photoresistor can replace photoresistor 17 located in the housing 30 by inserting the plug 52 into jack 51. As the attachment wire 53 is of considerable length auxiliary photosensitive element 31 can be placed in a remote location to allow the light levels there to control the adapter.

Figure 3:
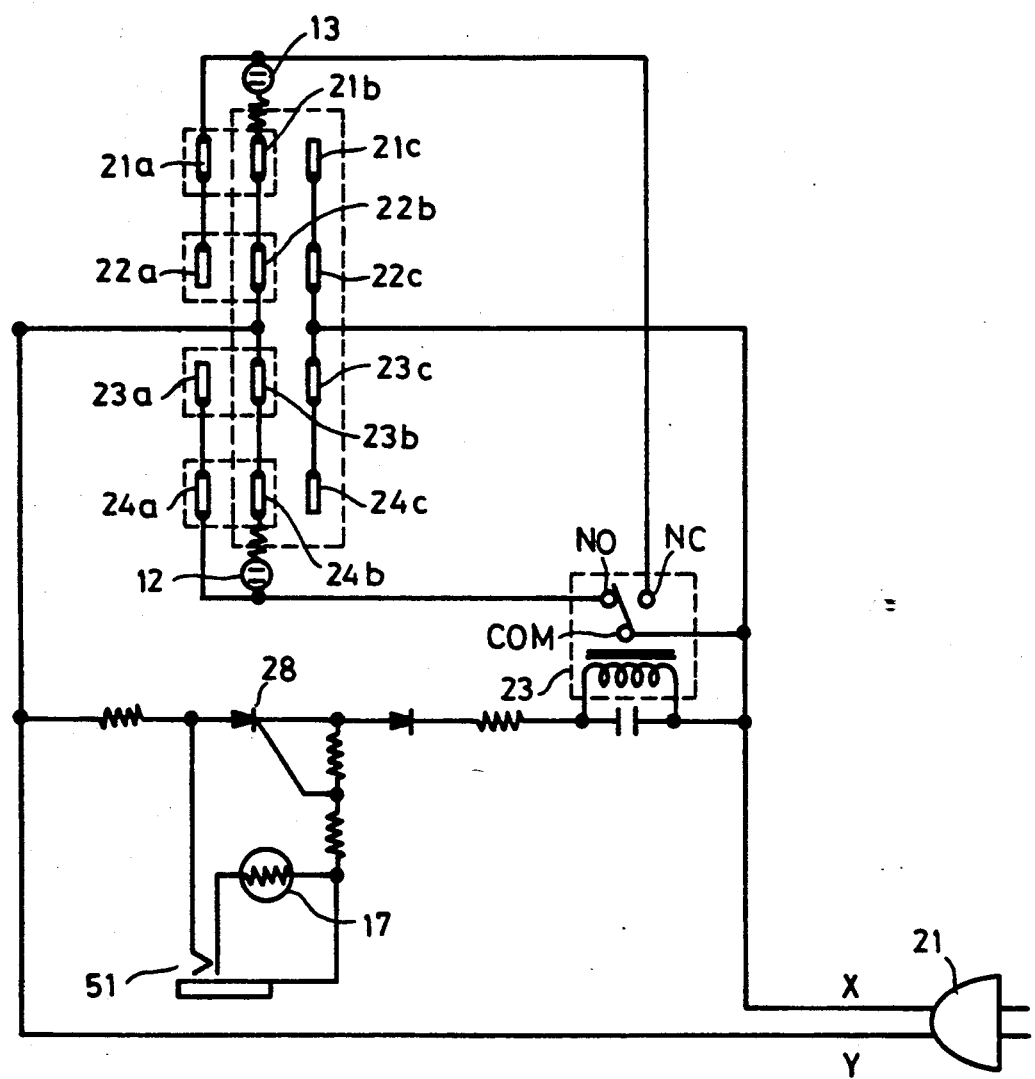
FIG. 3 is a circuit diagram of a second embodiment of a control circuit for the extension adapter of the present invention.

Referring to FIG. 3, a second embodiment of a control circuit is illustrated. It is very similar with the first embodiment. The main variation being the use of SCR 28 instead of a triac. As in the former embodiment, photoresistor 17 controls SCR 28, which activates AC relay 23.

Figure 4:
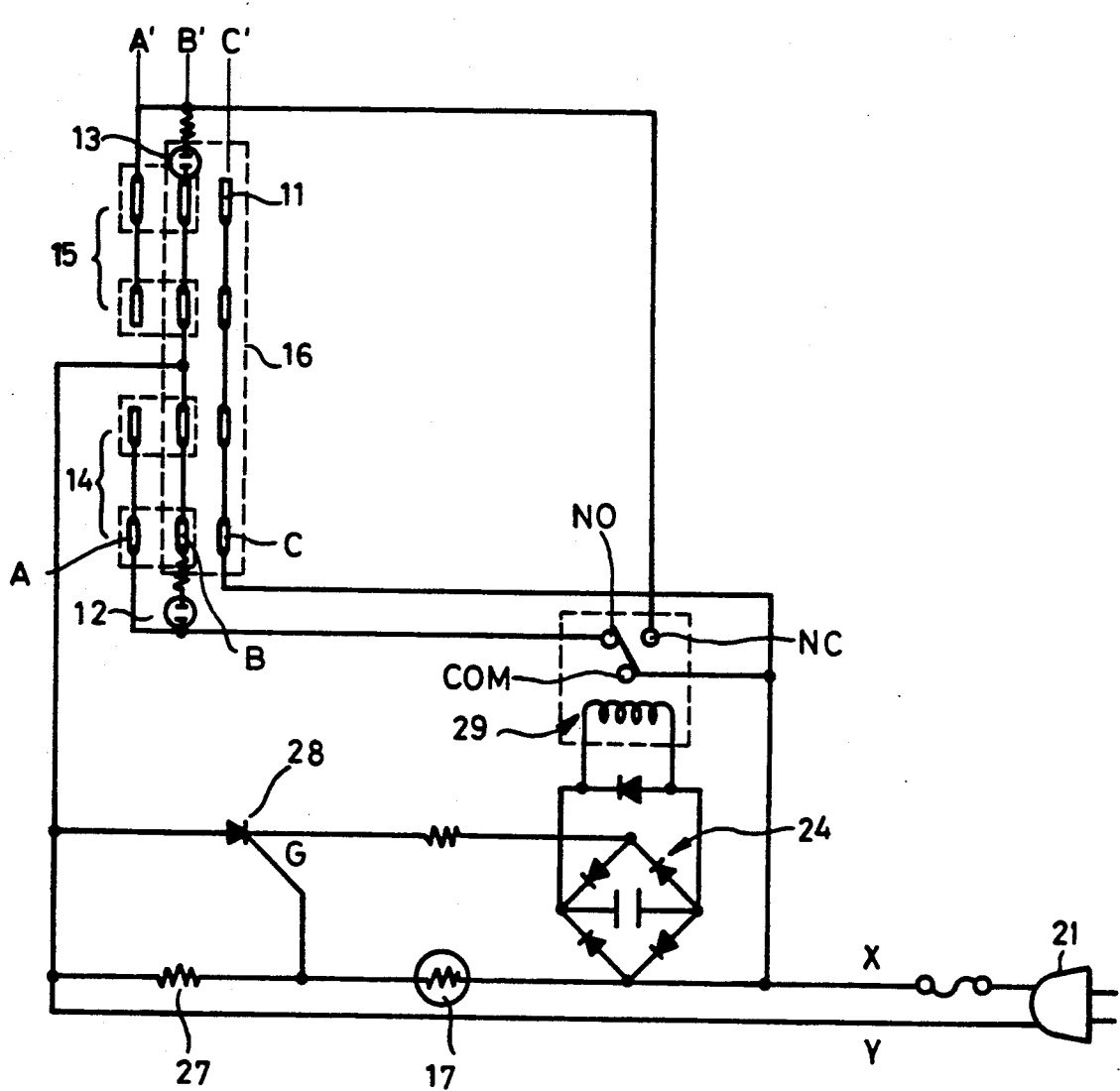
FIG. 4 is a circuit diagram of a third embodiment of a control circuit for the extension adapter of the present invention.

A third embodiment is shown in FIG. 4. This embodiment uses SCR 28 as in the second embodiment but the current it controls is passed to a bridge rectifier 24 whose DC output is passed to the electromagnet of DC relay 29.

The embodiment of the present invention described above is to considered in all respects as merely illustrative of principles of the present invention. Accordingly, the present invention is to be limited only by the scope of the hereinafter appended claims.

I claim:

1. A light level controlled electrical extension adapter comprising a main body, two sets of insertion sockets disposed on the top of said main body, an indicator light for each said set of insertion sockets, a photoresistor exposed on the top of said main body, a power cord, and a control circuit disposed internally within said main body;

said sets of insertion sockets comprising at least two insertion sockets, each said insertion socket having three recieving slots for receiving an electrical power plug attached to an appliance;

the middle receiving slot of each said insertion socket being in constant electrical communication with one terminal of said power cord, the right receiving slot of each said insertion socket being in constant electrical communication with the other terminal of said power cord;

the left receiving slot of each said insertion socket of each respective said set of insertion sockets are in electrical communication with a respective output pole of a relay within said control circuit, said relay is in turn activated by a thyristor which is switched on by said photoresistor whose resistance is controlled by ambient light levels;

whereby, a said power plug inserted on the right of any said insertion socket is in constant electrical communication with said power cord, and a said power plug inserted on the left of a said insertion socket of one said set of insertion sockets has its power controlled by said control circuit, the power of one said set of insertion sockets being on while the power to the other said set of insertion sockets is off, a respective said indicator light being on when power is available to its respective said set of insertion sockets.

2. A light level controlled electrical extension adapter according to claim 1 wherein an auxiliary photoresistor with attached wire and plug can electrically communicate with said control circuit by insertion of said plug into a jack on said main body, so that the light level in a remote location can be used to control the extension adapter of the present invention.

* * * * *